United States Patent
Kurihara (10) Patent No.: US 7,113,164 B1
(45) Date of Patent: Sep. 26, 2006

(54) LIQUID CRYSTAL DISPLAY DEVICE

(75) Inventor: Hiroshi Kurihara, Mobara (JP)

(73) Assignee: Hitachi Displays, Ltd., Chiba-ken (JP)

( * ) Notice: Subject to any disclaimer, the term of this patent is extended or adjusted under 35 U.S.C. 154(b) by 496 days.

(21) Appl. No.: 10/730,007

(22) Filed: Dec. 9, 2003

(30) Foreign Application Priority Data

Dec. 9, 2002 (JP) .............................. 2002-356890

(51) Int. Cl.
*G09G 3/36* (2006.01)

(52) U.S. Cl. ......................................... 345/102; 345/89

(58) Field of Classification Search ................. 345/87, 345/89, 102
See application file for complete search history.

(56) References Cited

U.S. PATENT DOCUMENTS 5,945,965 A * 8/1999 Inoguchi et al. ................ 345/6
6,097,836 A * 8/2000 Inoue .......................... 382/165
6,816,142 B1 * 11/2004 Oda et al. ...................... 345/89
6,828,954 B1 * 12/2004 Yoshihara et al. ............ 345/102
2005/0078081 A1 * 4/2005 Oda et al. .................... 345/102

* cited by examiner

*Primary Examiner*—Ricardo Osorio
(74) *Attorney, Agent, or Firm*—Reed Smith LLP; Stanley P. Fisher, Esq.; Juan Carlos A. Marquez, Esq.

(57) ABSTRACT

A liquid crystal display device of reduced power consumption has a liquid crystal display panel and at least a backlight unit disposed in opposition to a liquid crystal display part of the liquid crystal display panel. The surface of the backlight unit that is opposed to the liquid crystal display panel is divided into a plurality of subunits capable of being individually adjusted in brightness, and the liquid crystal display part is divided into pixel blocks which are surface portions opposed to the respective subunits. The liquid crystal display device includes a first unit for calculating the highest brightness from display data inputted to individual pixels in each of the pixel blocks, and a second unit for adjusting, according to the magnitude of the highest brightness calculated by the first means, the brightness of each of the opposed subunits.

17 Claims, 5 Drawing Sheets

LIQUID CRYSTAL DISPLAY DEVICE

BACKGROUND OF THE INVENTION

The present invention relates to a liquid crystal display device, and more particularly, to a liquid crystal display device having a backlight unit on the back surface of its liquid crystal display panel.

The liquid crystal display panel has a construction in which a vessel is formed by transparent substrates disposed in opposition to each other with a liquid crystal interposed therebetween and a multiplicity of pixels are formed to be arranged in the spreading direction of the liquid crystal.

Each of the pixels is provided with a pair of electrodes for generating an electric field, and the optical transmissivity of the liquid crystal is controlled by the electric field.

Accordingly, it is common practice that a backlight unit serving as a light source is provided on the back surface of the liquid crystal display panel.

Various kinds of backlight units are known, and there is a recently known type of backlight unit, for reduction in the power sumption in which light-emitting diodes (LEDs) of three kinds which emit red, blue and green lights, respectively, are separately disposed in close proximity to one another (Patent Document 1 (JP-A-7-191311) and Patent Document 2 (JP-A-10-221692)).

BRIEF SUMMARY OF THE INVENTION

However, when the liquid crystal display device is in use, the backlight unit constructed in this manner is driven to emit light consistently with high brightness, similarly to existing types of backlight units. Accordingly, there has been a demand for a further reduction in the power consumption of such a backlight unit.

The invention has been made in view of this problem, and an object of the invention is to provide a liquid crystal display device capable of being reduced in power consumption to a further extent.

Representative aspects of the invention disclosed herein will be described below in brief.

The aspects of the invention will described below.

According to one aspect of the invention, a liquid crystal display device has a liquid crystal display panel and a backlight unit disposed in opposition to a liquid crystal display part of the liquid crystal display panel, and the backlight unit is divided into a plurality of subunits capable of being individually adjusted in brightness and the liquid crystal display part is divided into pixel blocks which are surface portions opposed to the respective subunits. The liquid crystal display device includes first means for calculating a highest brightness from display data inputted to individual pixels in each of the pixel blocks, and second means for adjusting, according to the magnitude of the highest brightness of each of the pixel blocks calculated by the first means, a brightness of a corresponding one of the subunits opposed to the respective pixel blocks.

According to another aspect of the invention, a liquid crystal display device has a liquid crystal display panel and a backlight unit disposed in opposition to a liquid crystal display part of the liquid crystal display panel, and the backlight unit is divided into a plurality of subunits capable of being individually adjusted in brightness and the liquid crystal display part is divided into pixel blocks which are surface portions opposed to the respective subunits. The liquid crystal display device includes: first means for calculating display data indicative of a highest brightness from display data inputted to individual pixels in each of the pixel blocks; second means for increasing a gray scale level of the display data inputted to each of the pixels of each of the pixel blocks, according to the highest brightness of the corresponding one of the pixel blocks calculated by the first means; and third means for decreasing, according to the highest brightness of each of the pixel blocks calculated by the first means, a brightness of the corresponding one of the subunits opposed to the respective pixel blocks.

According to another aspect of the invention, a liquid crystal display device has a liquid crystal display panel and a backlight unit disposed in opposition to a liquid crystal display part of the liquid crystal display panel, and the backlight unit is divided into a plurality of subunits capable of being individually adjusted in brightness and the liquid crystal display part is divided into pixel blocks which are surface portions opposed to the respective subunits. The liquid crystal display device includes: first means for extracting an arbitrary number of display data from at least one half of display data of higher brightness among all display data inputted to individual pixels of each of the pixel blocks, and calculating a brightness of each of the pixel blocks from a total brightness or an average brightness according to the extracted display data; and second means for adjusting, according to the magnitude of the brightness of each of the pixel blocks calculated by the first means, a brightness of a corresponding one of the subunits opposed to the respective pixel blocks.

The first means calculates the brightness according to, for example, gray scale levels of the extracted display data. In addition, the first means extracts, for example, one or more display data. The number of display data to be extracted may also be two or more.

According to another aspect of the invention, a liquid crystal display device has a liquid crystal display panel and a backlight unit disposed in opposition to a liquid crystal display part of the liquid crystal display panel, and the backlight unit is divided into a plurality of subunits capable of being individually adjusted in brightness and the liquid crystal display part is divided into pixel blocks which are surface portions opposed to the respective subunits. The liquid crystal display device includes: first means for extracting an arbitrary number of display data from at least one half of display data of higher brightness among all display data inputted to individual pixels of each of the pixel blocks, and calculating a brightness of each of the pixel blocks from a total brightness or an average brightness according to the extracted display data; second means for increasing, according to the brightness of each of the pixel blocks calculated by the first means, a gray scale level of each of the display data inputted to the respective pixels of the pixel block itself; and third means for decreasing, according to the brightness of each of the pixel blocks calculated by the first means, the brightness of a corresponding one of the subunits opposed to the respective pixel blocks.

The first means calculates the brightness according to, for example, gray scale levels of the extracted display data. The first means extracts, for example, one or more display data. The number or display data to be extracted may also be two or more.

The invention is not limited to any of the above-described construction, and can be modified in various ways without departing from the technical idea of the invention.

BRIEF DESCRIPTION OF THE SEVERAL VIEWS OF THE DRAWING

The invention will become more readily appreciated and understood from the following detailed description of preferred embodiments of the invention when taken in conjunction with the accompanying drawings, in which.

DETAILED DESCRIPTION OF THE INVENTION

Preferred embodiments of a liquid crystal display device according to the invention will be described below with reference to the accompanying drawings.

Embodiment 1

Figure 2:
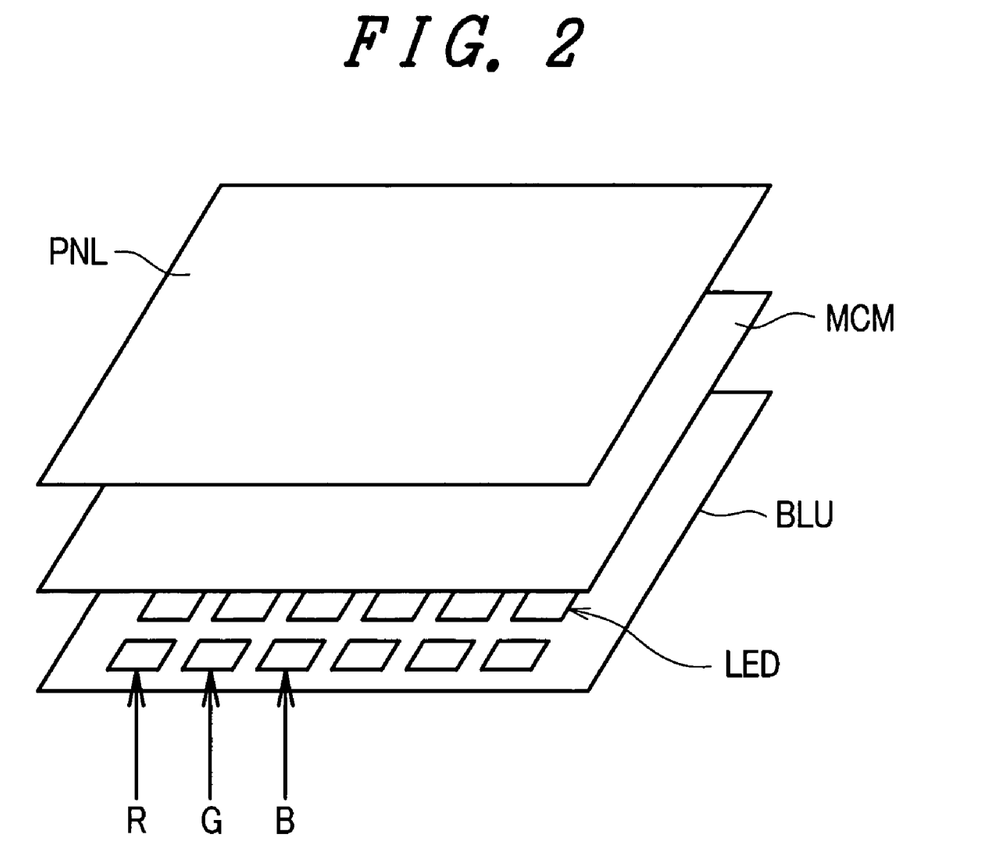
FIG. 2 is a schematic, exploded perspective view showing the first embodiment of the liquid crystal display device according to the invention.

FIG. 2 is a schematic view showing the construction of one embodiment of a liquid crystal display device according to the invention. In FIG. 2, a liquid crystal display panel PNL, color mixing means MCM and a backlight unit BLU are arranged in that order from an observer side.

The liquid crystal display panel PNL has a construction in which a vessel is formed by, for example, transparent substrates disposed in opposition to each other with a liquid crystal interposed therebetween and a multiplicity of pixels are formed to be arranged in the spreading direction of the liquid crystal. In each of the pixels, the liquid crystal is varied in optical transmissivity by an electric field generated by a pair of electrodes provided in itself and light from the backlight unit BLU is allowed to be transmitted through the liquid crystal so as to reach the eyes of an observer.

The liquid crystal display panel PNL also has a liquid crystal drive circuit including, for example, a scanning signal drive circuit and a video signal drive circuit which are mounted on the periphery of its liquid crystal display part. Display data inputted to the liquid crystal display device from the outside thereof is inputted to the liquid crystal drive circuit, and an image is displayed on the liquid crystal display part by a scanning signal and a video signal supplied from the liquid crystal drive circuit.

It is to be noted that this liquid crystal display panel PNL is, for example, of the type which provides color display and whose pixels each have three mutually adjacent pixels containing red, blue and green filters, respectively.

The backlight unit BLU has a construction in which a multiplicity of light-emitting diodes LED are arranged in a matrix form on a substrate of approximately the same size as the liquid crystal display panel PNL on the side where the liquid crystal display panel PNL is disposed.

These light-emitting diodes LED are arranged so that, for example, light-emitting diodes of the same kind that emit light of the same color are arrayed in the same column in the y direction of the substrate, and are also arrayed to repeat the order of red (R), green (G) and blue (B) along the same row in the x direction of the substrate.

In this case, the respective light-emitting diodes LED need not be disposed to correspond to the individual pixels of the liquid crystal display panel PNL, and, for example, each individual one of the light-emitting diodes LED may be disposed in opposition to a plurality of adjacent ones of the pixels of the liquid crystal display panel PNL.

The color mixing means MCM is made of, for example, an optical sheet, and serves to mix lights of different colors emitted from the backlight unit BLU and transmit white light to the liquid crystal display panel PNL.

Figure 1:
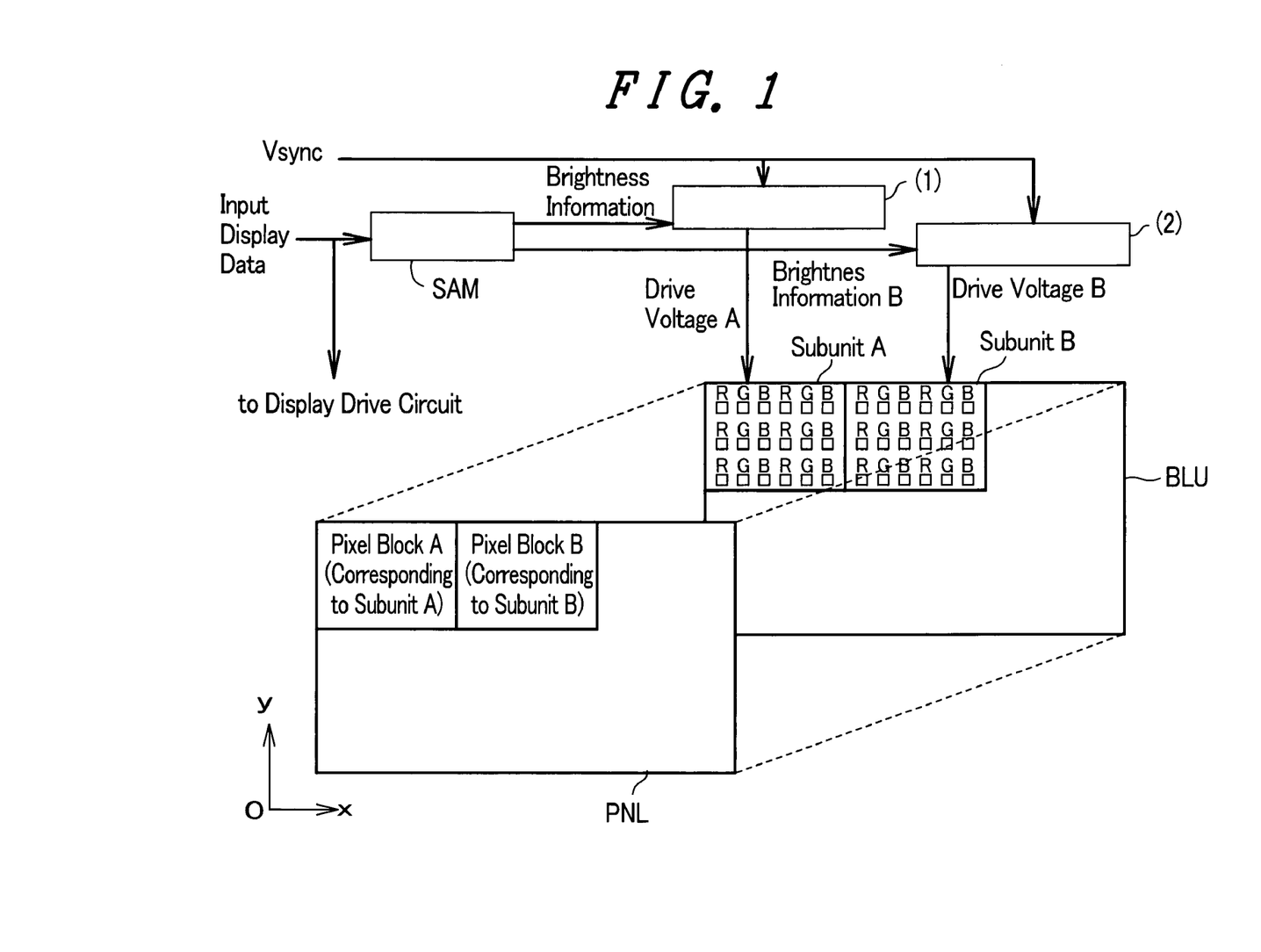
FIG. 1 is a schematic view showing the construction of a first embodiment of a liquid crystal display device according to the invention.

As shown in FIG. 1, the light-emitting diodes LED of the backlight unit BLU are grouped into a plurality of subunits A, B, . . . , each of which includes mutually adjacent ones of the light-emitting diodes LED. Brightness to be provided by the light-emitting diodes LED is adjusted for each of the subunits A, B, . . . .

In this embodiment, the light-emitting diodes LED of the backlight unit BLU is grouped into a plurality of subunits in both of the x and y directions, but may also be grouped into a plurality of subunits in only either one of the x and y directions. The number of subunits into which the light-emitting diodes LED are to be grouped may be arbitrary, but it goes without saying that it is far more preferable to increase such number.

Display data inputted to the liquid crystal display panel PNL is inputted to the liquid crystal drive circuit incorporated in the liquid crystal display panel PNL and to display gray scale analysis means SAM.

The display gray scale analysis means SAM is constructed to perform the following operation. Namely, the liquid crystal display part of the liquid crystal display panel PNL is divided into portions which are respectively opposed to the corresponding ones of the subunits A, B, . . . of the backlight unit BLU, that is to say, portions each of which allows transmission of light from the corresponding one of the subunits A, B, . . . , and the display gray scale analysis means SAM calculates the brightness of a video signal representative of the highest brightness among video signals (for example, gray scale levels) supplied to the respective pixels of each of the thus-divided pixel blocks A, B, . . . of the liquid crystal display panel PNL, on the basis of pixel information inputted to each of the pixels of each individual one of the pixel blocks A, B, . . . .

It is therefore to be understood that the division of the liquid crystal display panel PNL merely signifies division into domains on each of which to calculate the brightness of a pixel having the highest brightness among a plurality of pixels, and shall not be construed to divide the liquid crystal display panel PNL physically nor electrically.

After the highest brightness has been calculated on each of the pixel blocks A, B, . . . in this manner, signals corresponding to the respective highest brightnesses are inputted to the corresponding ones of subunit brightness adjustment means A(1), B(2), . . . which respectively adjust the brightnesses of the subunits A, B, . . . of the backlight unit BLU that correspond to the respective pixel blocks A, B, . . . .

Each of the subunit brightness adjustment means A(1), B(2), . . . is operative to cause emissions from the light-emitting diodes LED of the corresponding one of the subunits A, B, . . . according to the highest brightness thereof on the basis of its input signal. Namely, if the highest brightness in any one or ones of the pixel blocks A, B, . . . is low, the brightness of the corresponding one or ones of the subunits A, B, . . . is set low; whereas if the highest brightness in any one or ones of the pixel blocks A, B, . . . is high, the brightness of the corresponding one or ones of the subunits A, B, . . . is set high.

Driving of each of the subunit brightness adjustment means A(1), B(2), . . . is effected by a vertical synchronizing signal Vsync supplied to the liquid crystal display device.

Figure 3:
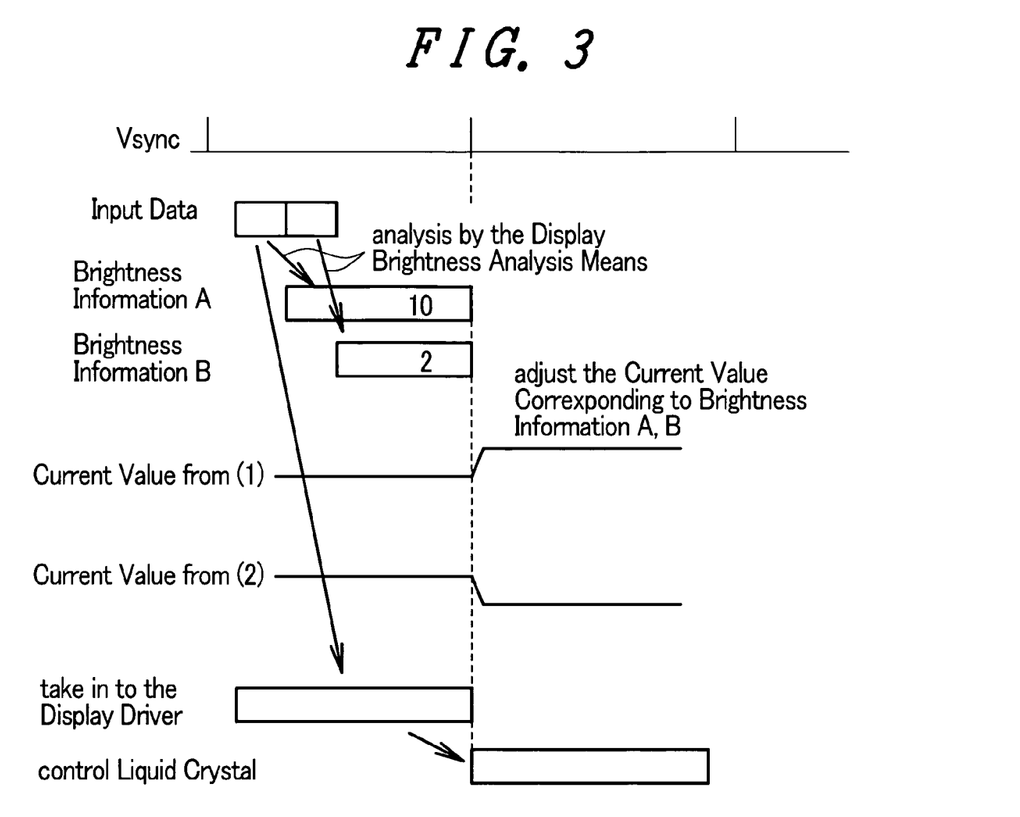
FIG. 3 is an explanatory view showing the operation of the liquid crystal display device according to the invention.

FIG. 3 is an explanatory view showing further details of the operation of the liquid crystal display device. In the following description, reference will be made to the case where the highest brightness of, for example, the pixel block A corresponding to the position of the subunit A is a gray scale level of, for example, 255 (white), while the highest brightness of, for example, the pixel block B corresponding to the position of the subunit B is a gray scale level of, for example, 50.

The display gray scale analysis means SAM analyzes input data, and finds, for example, 10 as brightness information A as to each pixel of the pixel block A corresponding to the position of the subunit A and, for example, 2 as brightness information B as to each pixel of the pixel block B corresponding to the position of the subunit B. This operation means that the display gray scale analysis means SAM employs a table in which, for example, gray scale levels of 0 to 255 are divided into 10 levels, and, in the case of a gray scale level of 255, finds brightness information indicative of the maximum level of 10 from among the 10 levels, and, in the case of a gray scale level of 50, finds brightness information indicative of the second lowest level of 2 from among the 10 levels.

Then, the brightness information A is inputted to the subunit brightness adjustment means A(1), and the subunit brightness adjustment means A(1) adjusts the value of an electric current to flow into the light-emitting diodes LED of the subunit A, on the basis of the brightness information A, and causes the light-emitting diodes LED to emit light. In this case, the light-emitting diodes LED emit light with brightness corresponding to the brightness information of 10, that is to say, with high brightness.

In addition, the brightness information B is inputted to the subunit brightness adjustment means B(2), and the subunit brightness adjustment means B(2) adjusts the value of an electric current to flow into the light-emitting diodes LED of the subunit B, on the basis of the brightness information B, and causes the light-emitting diodes LED to emit light. In this case, the light-emitting diodes LED emit light with brightness corresponding to the brightness information of 2, that is to say, with comparatively low brightness.

In the meantime, the input data is also inputted to the video signal drive circuit and to the scanning signal drive circuit, and is visually displayed on the liquid crystal display panel PNL.

Figure 4:
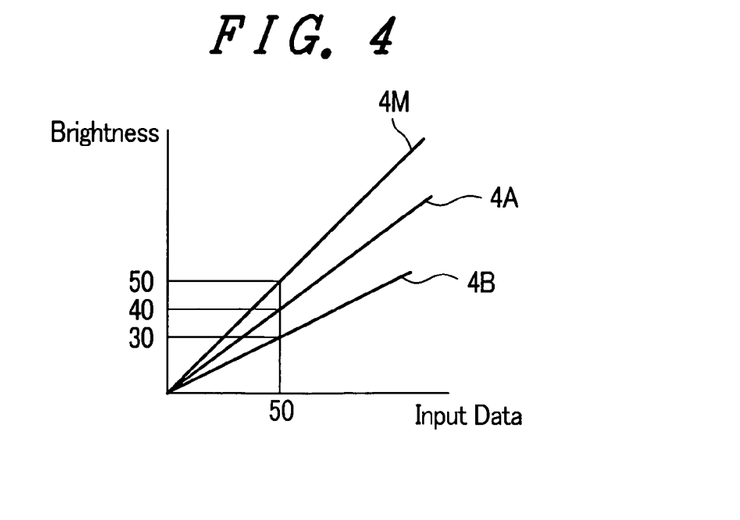
FIG. 4 is a graph showing the relationship between input data and display brightness in the first embodiment of the liquid crystal display device according to the invention.

FIG. 4 shows the relationship between the input data and display brightness (brightness recognized by an observer) in this embodiment. In this case, with respect to the same input data (for example, a gray scale level of 50), the pixel block A exhibits a display brightness of, for example, 40, while the pixel block B exhibits a display brightness of, for example, 30. In either case, the display brightness is smaller than the display brightness of 50 obtainable from the highest brightness of the backlight unit BLU. This is because each of the subunit brightness adjustment means adjusts the brightness of the corresponding one of the subunits in the backlight unit BLU, while the brightness of each pixel in the corresponding one of the pixel blocks of the liquid crystal display panel PNL is also adjusted on the basis of the input display data.

However, even in this case, the backlight unit BLU adjusts the brightnesses of its domains corresponding to the respective divided domains of the liquid crystal display panel PNL according to the magnitudes of the brightnesses of the respective divided domains of the image displayed on the liquid crystal display panel PNL, whereby low power consumption can be realized.

Embodiment 2

Figure 5:
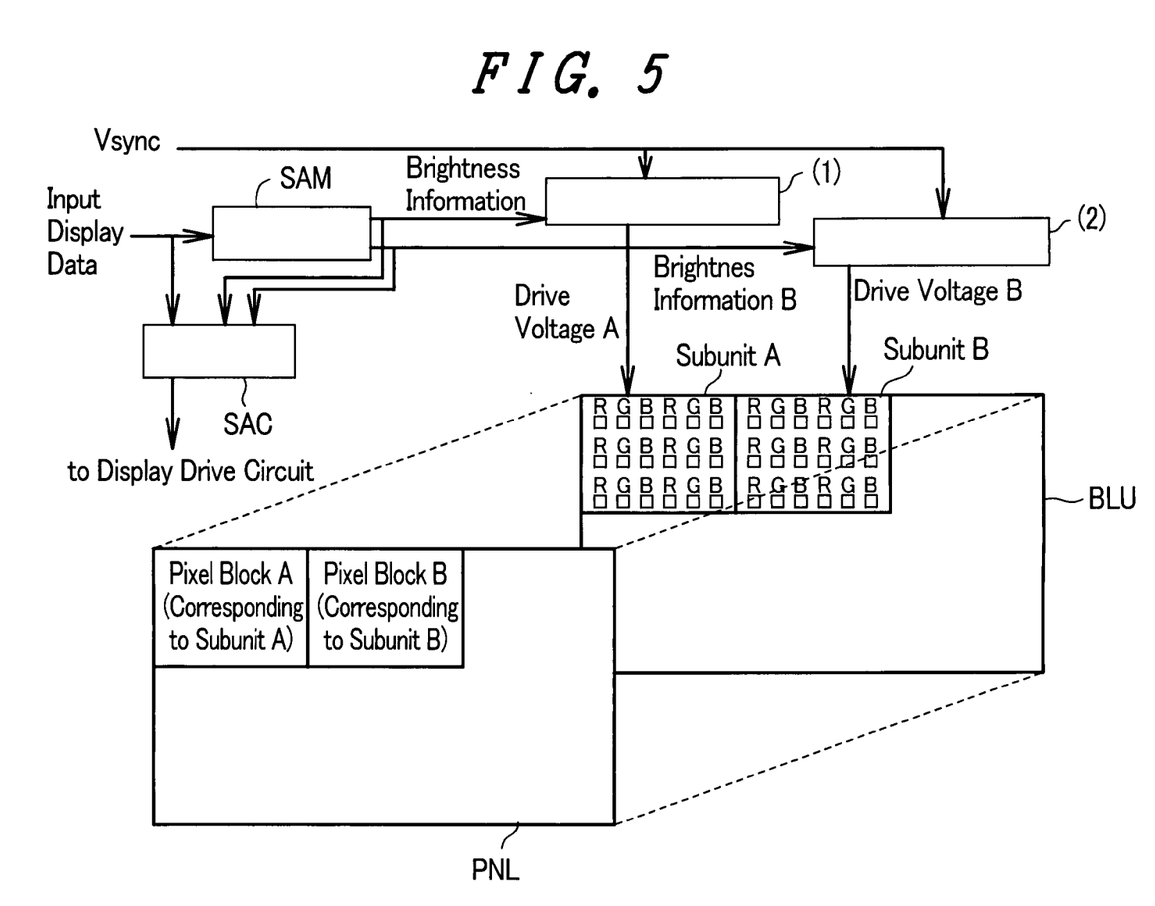
FIG. 5 is a schematic view showing the construction of a second embodiment of the liquid crystal display device according to the invention.

FIG. 5 is a schematic view showing the construction of another embodiment of the liquid crystal display device according to the invention, and FIG. 5 is a view corresponding to FIG. 1.

The construction shown in FIG. 5 differs from that shown in FIG. 1 in that a liquid-crystal-driving gray scale compensation circuit SAC is newly added, and display data to be inputted to the display gray scale analysis means SAM and the brightness information A, B, . . . to be inputted to the respective subunit brightness adjustment means A(1), B(2), . . . from the display gray scale analysis means SAM are inputted to the liquid-crystal-driving gray scale compensation circuit SAC.

The output from the liquid-crystal-driving gray scale compensation circuit SAC is transmitted to the liquid crystal drive circuit of the liquid crystal display panel PNL.

Namely, the liquid-crystal-driving gray scale compensation circuit SAC increases the gray scale levels of video signals supplied to the respective pixels of each of the pixel blocks A, B, . . . corresponding to the display data, on the basis of the input brightness information A, B, . . . .

In this case, it is appropriate that the magnitude of increase of the gray scale levels of the video signals is made smaller as the values of the brightness information (A, B, . . . ) supplied from the display gray scale analysis means SAM become larger, while the magnitude of increase of the gray scale levels is made larger as such values become smaller.

It goes without saying that the magnitude of increase of the gray scale levels of the video signals is adjusted between white display and black display according to the brightness value of the above-described highest brightness.

According to this construction, the liquid-crystal-driving gray scale compensation circuit SAC can solve the disadvantage that the display brightness lowers as shown in FIG. 4 in the case of the construction of the liquid crystal display device shown in FIG. 1.

Figure 6:
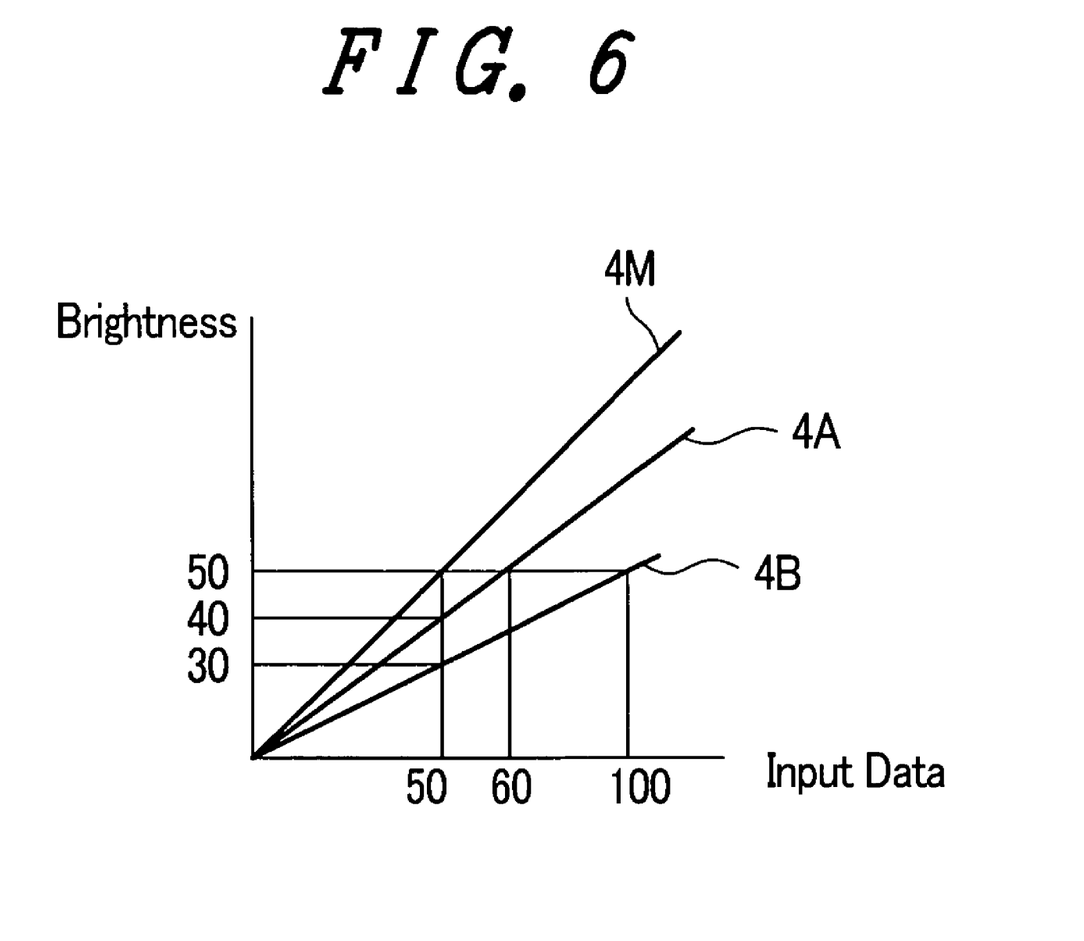
FIG. 6 is a graph showing the relationship between input data and display brightness in the second embodiment of the liquid crystal display device according to the invention.

FIG. 6 is a view showing the relationship between the input data and the display brightness (brightness recognized by an observer) in this embodiment. FIG. 6 is a graph corresponding to FIG. 4.

Specifically, if the input data has a gray scale level of 50 similarly to that shown in FIG. 4, the brightness information of video signals supplied to the pixel block A is increase to, for example, a gray scale level of 60, while the brightness information of video signals supplied to the pixel block B is increased to, for example, a gray scale level of 100.

Accordingly, in either of the pixel blocks A and B, the display brightness is recognized as a gray scale level of 50 by an observer, so that light from the backlight unit BLU can be used to the maximum.

As is apparent from the foregoing description, according to the liquid crystal display device of the invention, it is possible to realize a far lower power consumption.

In either of Embodiments 1 and 2, the highest brightness is calculated from display data inputted to the respective pixels of each of the pixel blocks and the magnitudes of the brightnesses of the respective pixel blocks are determined, but it is, of course, possible to use other methods as will be described below.

For example, display data inputted to the respective pixels of each of the pixel blocks are sorted from the highest brightness to the lowest brightness, and an arbitrary number of display data are extracted from one half of the display data counted from the display data of highest brightness, whereby the magnitude of brightness of each of the pixel blocks can be determined from the total brightness or the average brightness of the extracted display data. The number of display data to be extracted may be arbitrary, for example, one, two or three, but it is desirable to extract about one to three display data having as high brightness as possible.

Otherwise, display data inputted to the respective pixels of each of the pixel blocks are sorted from the highest brightness to the lowest brightness, and an arbitrary number of display data are extracted from the one-thirds of the display data that are counted from the display data of highest brightness, whereby the magnitude of brightness of each of the pixel blocks can be determined from the total brightness or the average brightness of the extracted display data.

Otherwise, display data inputted to the respective pixels of each of the pixel blocks are sorted from the highest brightness to the lowest brightness, and an arbitrary number of display data are extracted from any of the one-fourths, one-fifths, . . . of the display data that are counted from the display data of highest brightness, whereby the magnitude of brightness of each of the pixel blocks can be determined from the total brightness or the average brightness of the extracted display data. In the case of these fine divisions as well, it is possible to calculate the highest brightness from display data inputted to the respective pixels of each of the pixel blocks and determine the magnitude of brightness of each of the pixel blocks, as described previously in Embodiments 1 and 2.

The invention claimed is:

1. A liquid crystal display device having a liquid crystal display panel and a backlight unit disposed in opposition to a liquid crystal display part of the liquid crystal display panel,
   the backlight unit being divided into a plurality of subunits capable of being individually adjusted in brightness,
   the liquid crystal display part being divided into pixel blocks which are surface portions opposed to the respective subunits,
   the liquid crystal display device comprising:
   first means for calculating a highest brightness from display data inputted to individual pixels in each of the pixel blocks; and
   second means for adjusting, according to the magnitude of the highest brightness of each of the pixel blocks calculated by the first means, a brightness of a corresponding one of the subunits opposed to the respective pixel blocks.

2. A liquid crystal display device according to claim 1, wherein the backlight unit has a construction in which a plurality of light-emitting elements are arranged on a surface opposed to the liquid crystal display panel.

3. A liquid crystal display device according to claim 1, wherein the backlight unit has a construction in which a plurality of light-emitting diodes are arranged on a surface opposed to the liquid crystal display panel and the light-emitting diodes include light-emitting diodes of three kinds which respectively emit red, blue and green lights and are disposed adjacently to one another, color mixing means being provided between the backlight unit and the liquid crystal display panel.

4. A liquid crystal display device according to claim 1, wherein the backlight unit is divided into a plurality of subunits arranged in one direction and in another direction intersecting the one direction.

5. A liquid crystal display device according to claim 1, wherein the backlight unit is divided into a plurality of subunits arranged in one direction.

6. A liquid crystal display device having a liquid crystal display panel and a backlight unit disposed in opposition to a liquid crystal display part of the liquid crystal display panel,
   the backlight unit being divided into a plurality of subunits capable of being individually adjusted in brightness,
   the liquid crystal display part being divided into pixel blocks which are surface portions opposed to the respective subunits,
   the liquid crystal display device comprising:
   first means for calculating display data indicative of a highest brightness from display data inputted to individual pixels in each of the pixel blocks;
   second means for increasing a gray scale level of the display data inputted to each of the pixels of each of the pixel blocks, according to the highest brightness of the corresponding one of the pixel blocks calculated by the first means; and
   third means for decreasing, according to the highest brightness of each of the pixel blocks calculated by the first means, a brightness of the corresponding one of the subunits opposed to the respective pixel blocks.

7. A liquid crystal display device according to claim 6, wherein the magnitude of increase of the gray scale level of the display data by the second means is adjusted between white display and black display according to the brightness value of the highest brightness.

8. A liquid crystal display device according to claim 6, wherein the backlight unit has a construction in which a plurality of light-emitting elements are arranged on a surface opposed to the liquid crystal display panel.

9. A liquid crystal display device according to claim 6, wherein the backlight unit has a construction in which a plurality of light-emitting diodes are arranged on a surface opposed to the liquid crystal display panel and the light-emitting diodes include light-emitting diodes of three kinds which respectively emit red, blue and green lights and are disposed adjacently to one another, color mixing means being provided between the backlight unit and the liquid crystal display panel.

10. A liquid crystal display device according to claim 6, wherein the backlight unit is divided into a plurality of subunits arranged in one direction and in another direction intersecting the one direction.

11. A liquid crystal display device according to claim 6, wherein the backlight unit is divided into a plurality of subunits arranged in one direction.

12. A liquid crystal display device having a liquid crystal display panel and a backlight unit disposed in opposition to a liquid crystal display part of the liquid crystal display panel,
   the backlight unit being divided into a plurality of subunits capable of being individually adjusted in brightness, the liquid crystal display part being divided into pixel blocks which are surface portions opposed to the respective subunits, the liquid crystal display device comprising:

first means for extracting an arbitrary number of display data from at least one half of display data of higher brightness among all display data inputted to individual pixels of each of the pixel blocks, and calculating a brightness of each of the pixel blocks from a total brightness or an average brightness according to the extracted display data; and second means for adjusting, according to the magnitude of the brightness of each of the pixel blocks calculated by the first means, a brightness of a corresponding one of the subunits opposed to the respective pixel blocks.

13. A liquid crystal display device according to claim 12, wherein the first means calculates the brightness according to gray scale levels of the extracted display data.

14. A liquid crystal display device according to claim 12, wherein the first means extracts one or more display data.

15. A liquid crystal display device having a liquid crystal display panel and a backlight unit disposed in opposition to a liquid crystal display part of the liquid crystal display panel, the backlight unit being divided into a plurality of subunits capable of being individually adjusted in brightness, the liquid crystal display part being divided into pixel blocks which are surface portions opposed to the respective subunits, the liquid crystal display device comprising:

first means for extracting an arbitrary number of display data from at least one half of display data of higher brightness among all display data inputted to individual pixels of each of the pixel blocks, and calculating a brightness of each of the pixel blocks from a total brightness or an average brightness according to the extracted display data;

second means for increasing, according to the brightness of each of the pixel blocks calculated by the first means, a gray scale level of each of the display data inputted to the respective pixels of the pixel block itself; and third means for decreasing, according to the brightness of each of the pixel blocks calculated by the first means, the brightness of a corresponding one of the subunits opposed to the respective pixel blocks.

16. A liquid crystal display device according to claim 15, wherein the first means calculates the brightness according to gray scale levels of the extracted display data.

17. A liquid crystal display device according to claim 15, wherein the first means extracts one or more display data.

* * * * *